Sept. 19, 1961 W. HAUPT 3,000,687

RECORDER FOR DIFFERENT TYPES OF INFORMATION

Filed May 22, 1957 6 Sheets-Sheet 1

INVENTOR
Wilhelm Haupt
BY: Michael S. Striker
ATTORNEY

Sept. 19, 1961 W. HAUPT 3,000,687

RECORDER FOR DIFFERENT TYPES OF INFORMATION

Filed May 22, 1957 6 Sheets-Sheet 2

INVENTOR
Wilhelm Haupt
BY: Michael S. Striker
ATTORNEY

RECORDER FOR DIFFERENT TYPES OF INFORMATION

Filed May 22, 1957 6 Sheets-Sheet 3

INVENTOR
Wilhelm Haupt
BY: Michael S. Striker
ATTORNEY

INVENTOR
Wilhelm Haupt
BY: Michael S. Striker
ATTORNEY

Sept. 19, 1961 W. HAUPT 3,000,687
RECORDER FOR DIFFERENT TYPES OF INFORMATION
Filed May 22, 1957 6 Sheets-Sheet 5

INVENTOR
Wilhelm Haupt
BY: Michael S. Striker
ATTORNEY

Sept. 19, 1961 W. HAUPT 3,000,687

RECORDER FOR DIFFERENT TYPES OF INFORMATION

Filed May 22, 1957 6 Sheets-Sheet 6

INVENTOR
Wilhelm Haupt
BY: Michael S. Striker
ATTORNEY

United States Patent Office 3,000,687

Patented Sept. 19, 1961

3,000,687

RECORDER FOR DIFFERENT TYPES OF INFORMATION

Wilhelm Haupt, Villingen, Black Forest, Germany, assignor to Kienzle Apparate G.m.b.H., Villingen, Black Forest, Germany Filed May 22, 1957, Ser. No. 660,817
Claims priority, application Germany Mar. 12, 1957
13 Claims. (Cl. 346—7)

The present invention relates to devices for recording information, such as devices used on vehicles for recording the times during which a vehicle is driven.

The present invention is an improvement of the structure disclosed in U.S. Patent No. 2,743,987.

With information recorders of the above type it is possible to record automatically the time of day during which a vehicle is driven, and also it is possible to indicate which one of a plurality of operators is driving the vehicle. However, additional information is also desirable such as, for example, the amount of time spent by an operator in a garage or the like engaged in preparatory activities before actual driving of the vehicle. With the present day development of the art it is necessary for a vehicle operator, for example, to make entries into a time book, and this procedure is far from satisfactory not only from the standpoint of inconvenience of the operator but also from the standpoint of accuracy of the entries.

One of the objects of the present invention is to provide an information recording device of the above type which will automatically record at least two different types of information such as the actual driving time of a vehicle and the time spent by an operator in preparation for driving, so that it is unnecessary for the operator to make entries into a time book.

Another object of the present invention is to provide an information recording device capable of recording at least two different types of information for each of a plurality of operators in a manner clearly indicating the operator to which the recorded information pertains.

A further object of the present invention is to provide a structure capable of accomplishing the above objects in a fully reliable manner while at the same time being of an exceedingly simple and relatively inexpensive construction.

With the above objects in view the present invention mainly consists of an information recorder adapted to be used with vehicles and the like, this recorder including a support means, a control pin, and a manually operable means movably carried by the support means and carrying the control pin for moving the latter along a predetermined path from a predetermined rest position in either of two different directions to either of a pair of end positions, the control pin having a pair of intermediate positions located between its rest position and its pair of end positions, respectively. A marking means is movable on the support means for making information on a sheet or the like, and this marking means has a control edge of predetermined configuration engaged by the control pin and cooperating therewith to locate the marking means in different marking positions when the control pin is in its rest, end, and intermediate positions, respectively, whereby information distinct from that recorded by the marking means when the pin is in either of its end positions is recorded by the marking means when the pin is in either of its intermediate positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
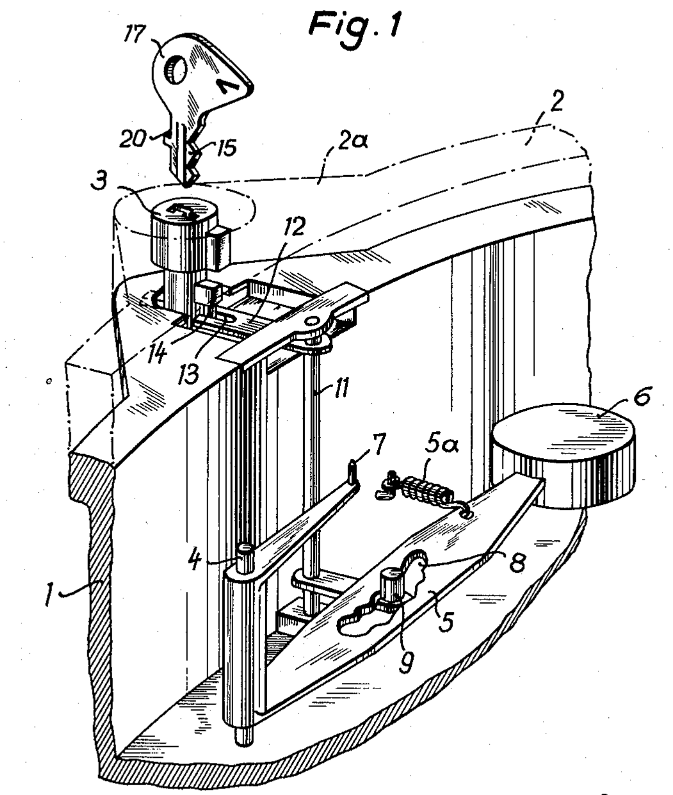
FIG. 1 is a fragmentary perspective view of one possible embodiment of a device according to the present invention.
Figure 13:
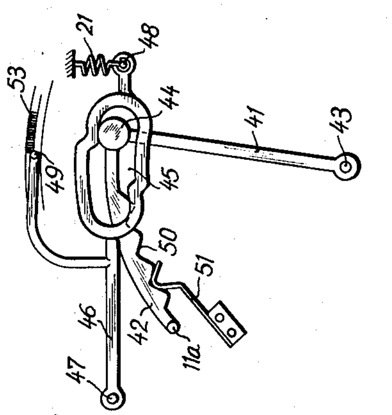
Figure 14:
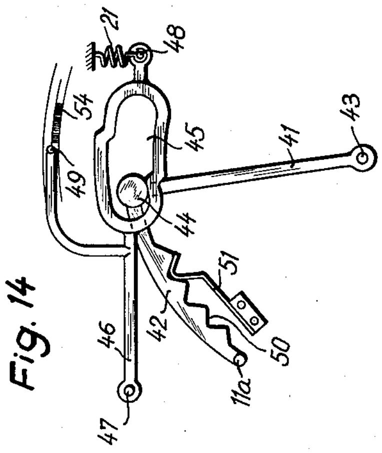
Figure 12:
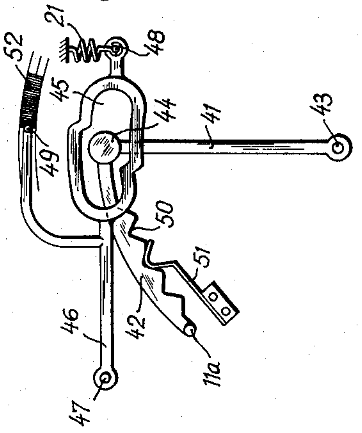
Figure 11:
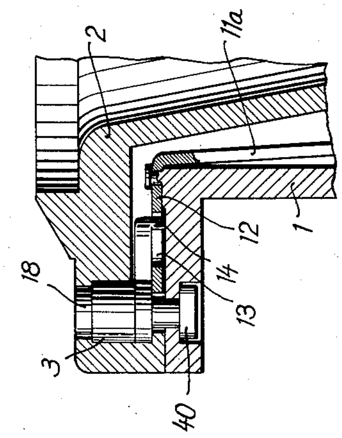
FIG. 11 is a fragmentary sectional elevational view showing an embodiment of a lock and lever means somewhat different from that of FIG. 1.
Figure 11A:
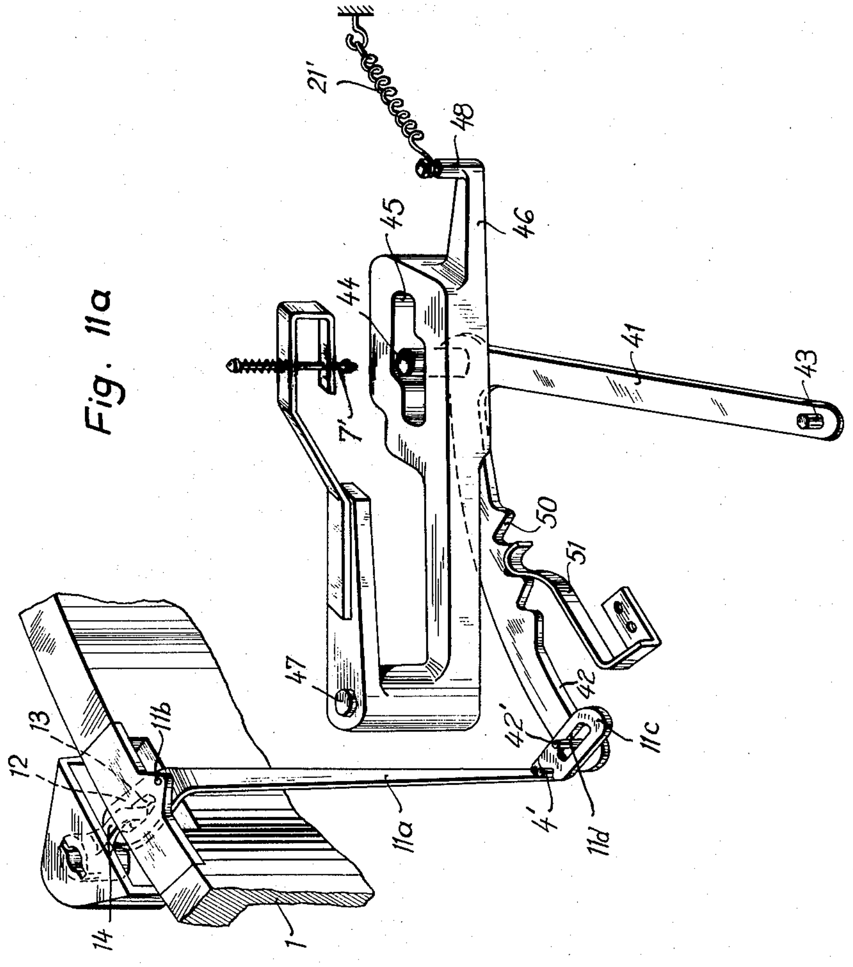
Figure 15:
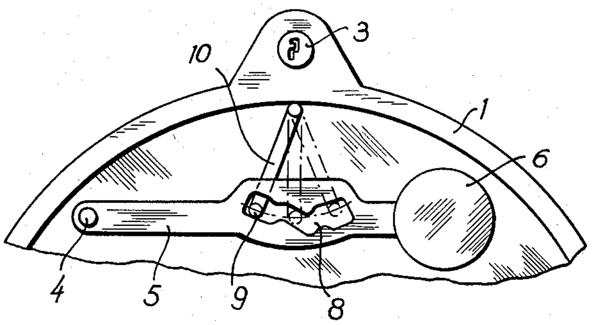
Figure 16:
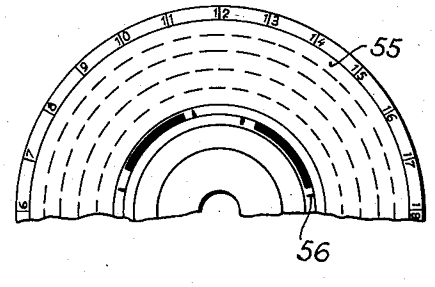
Figure 17:
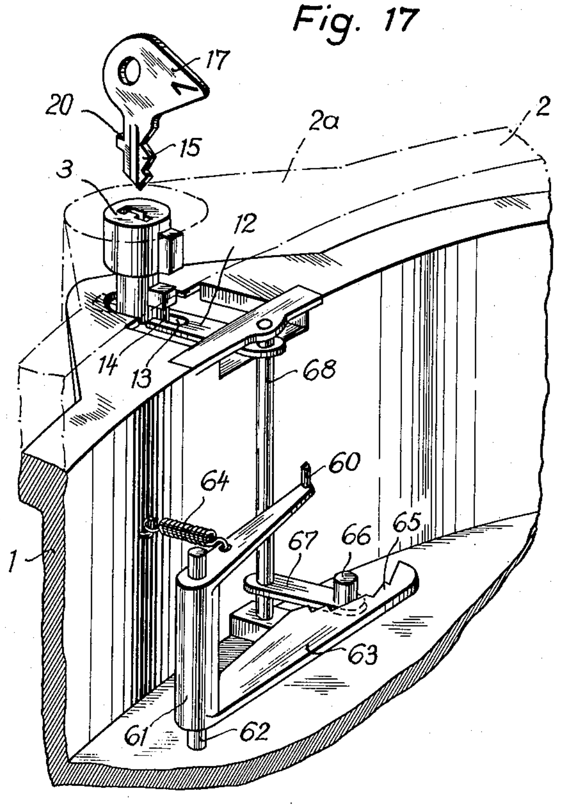
Figure 18:
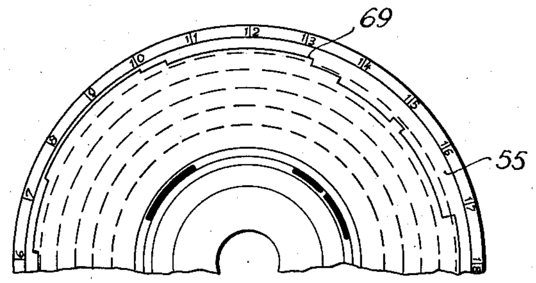

FIG. 11*a* is a fragmentary perspective view showing the remainder of the embodiment of FIG. 11 which is not illustrated in the latter;

FIGS. 12–14 are diagrammatic illustrations of the structure of FIG. 11*a* in three different positions, respectively;

FIG. 15 is a fragmentary plan view of a different embodiment of a marking means according to the present invention;

FIG. 16 is a fragmentary illustration of the mark made by the structure of FIG. 15;

FIG. 17 is a fragmentary perspective view of a device according to the present invention having a construction which in part is different from that of FIG. 1; and FIG. 18 is a fragmentary illustration of a mark made by the structure of FIG. 17.

Referring to FIG. 1 of the drawings, it will be seen that the structure of the invention includes a housing 1 which forms a support means for the structure of the invention and which is fixedly carried by a dashboard of a vehicle. The housing 1 receives at its rim a cover 2 which closes the housing 1 and which may be hingedly connected to the latter, for example, so as to be turnable between a position opening the housing and a position closing the housing. The periphery of the cover 2 has a projecting portion 2*a* which carries a lock means 3.

A marking means is located within the housing 1 for automatically producing a mark on a suitable card or sheet, and this marking means is pivotally supported for turning movement by an elongated pin 4 fixed at one end to the housing 1 in the interior thereof and passing through a tubular portion of the marking means, this tubular portion resting at its bottom end on a collar or the like fixed to the pin 4 so that in this way the marking means is spaced from the wall of the housing 1 which carries the pin 4 and which is distant from and directed toward the cover 2. The marking means includes a vibratory pendulum arm 5 fixed to one end of the tubular portion and carrying a weight 6 distant from the tubular portion and a second arm fixed to the opposite end of the tubular portion and carrying a suitable writing instrument 7. A spring 5*a* is connected at one end to the housing 1 and at its opposite end to the arm 5 so as to maintain the latter astatically balanced. The arm 5 of the marking means is provided with a control edge of predetermined configuration, this control edge defining an opening 8 formed in the arm 5.

A lever means is provided for controlling the operation of the marking means, and this lever means includes a control pin 9 located in the opening 8 and carried by a lever 10 of the lever means, this lever 10 being fixed to a shaft 11 of the lever means. The shaft 11 is supported at its opposite ends for turning movement, and at its end distant from the lever 10 the shaft 11 is fixedly connected with a lever 12 formed with an elongated cutout 13 into which extends a pin 14 which forms part of the lock means 3.

As may be seen from FIG. 11, the lock means 3 is carried by the cover 2 adjacent the outer periphery thereof and includes a turnable bolt 18 which terminates in a transverse portion 40 serving to lock the cover 2 to the rim of the housing 1. The lock means 3 includes a cylindrical portion fixed to the cover 2 and in which the bolt 18 is capable of turning while the bolt 18 is incapable of shifting axially with respect to the cylindrical outer sleeve of the lock means. When the bolt 18 is turned through 90° from the position shown in FIG. 11, the end portions of member 40 which extend radially beyond the bolt 18 become aligned with a pair of diametrically opposed slots or grooves extending axially along the opening in the rim of the cover 1 which receives the end of bolt 18 and member 40, so that the member 40 together with the entire lock means and the cover 2 can then be removed from the housing 1. The pin 14 is fixed to an intermediate portion of the bolt 18 and is thus removed also with the cover 2, the free end of the pin 14 simply moving out of the slot 13. Thus, when the cover is replaced it is only necessary to locate the free end of pin 14 in the slot 13 and to insert member 40 into the opening of the rim of the housing 1, and the lock bolt 18 is turned by a suitable key to 90° from the open position of the lock so as to place the lock in its locking position and thus lock the cover 2 in a position closing the housing 1.

Figure 2:
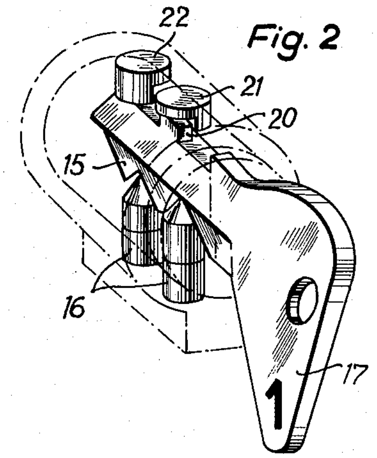
FIG. 2 is a diagrammatic perspective view of a lock and key according to the present invention.
Figure 3:
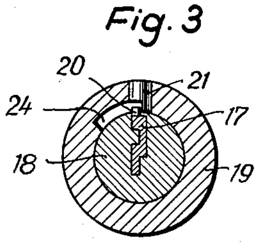
FIGS. 3 and 4 are respectively transverse sectional views of the structure of FIG. 2 respectively taken at different places along the structure.
Figure 4:
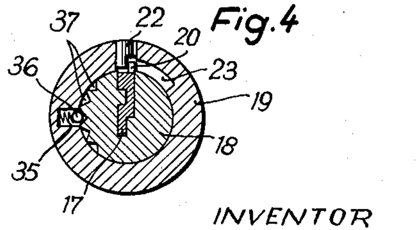
Figure 5:
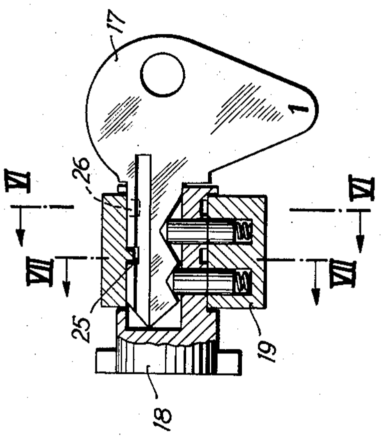
FIG. 5 is a longitudinal sectional elevational view of another embodiment of a key and lock arrangement according to the present invention.

A key 17 is provided for operating the lock, and this key has teeth 15 cooperating with spring pressed pins 16 of the lock in the manner shown in FIGS. 2 and 5. FIGS. 3 and 4 show the outer cylindrical sleeve 19 of the lock and the bolt 18 turnable therein. As is shown in FIGS. 2 and 3, one embodiment of a key includes a projection 20 at its edge opposite from the teeth 15. When the key is inserted into the lock the projection 20 is located at a predetermined position along the lock, and as is shown in FIGS. 2 and 3, this projection 20 is located alongside of a stop pin 21. This pin 21 is carried by the sleeve 19 and cooperates with the right side of projection 20, as viewed in FIGS. 2 and 3, to prevent clockwise turning of the key and bolt 18. This result is brought about by providing the bottom end of pin 21, as viewed in FIG. 3, with an angular notch having a vertical right face and a horizontal top face, as viewed in FIG. 3. This notch forms the right end of an arcuate groove 24 formed at the inner face of the sleeve 19 and extending through an angle of approximately 45° about the axis of the sleeve 19. Thus, the projection 20 is capable of moving in the groove 24 and the key of FIGS. 2 and 3 permits the bolt 18 to be turned through an angle of 45° in a counterclockwise direction as viewed in FIG. 3.

The sleeve 19 fixedly carries a second stop pin 22 spaced axially from the pin 21 and having at its bottom end, as viewed in FIG. 4, an angular notch identical with the notch of the pin 21 but directed in the opposite direction. The key which cooperates with the stop pin 22 is different from the key of FIGS. 2 and 3 in that its projection 20 is located at such a position that it will become positioned at the stop pin 22 when the key is inserted. The sleeve 19 is formed at its inner face with an additional arcuate groove 23 which terminates at its left end, as viewed in FIG. 4, in the notch of the pin 22, this groove 23 also extending about the axis of the sleeve 19 through an angle of 45°. Thus, when the key of FIG. 4 is inserted into the lock the bolt thereof may be turned in a clockwise direction, as viewed in FIG. 4, through 45°.

As may be seen from FIG. 4, the bolt 18 is formed in its left outer surface portion, as viewed in FIG. 4, with a plurality of detent recesses 37 distributed about the axis of the bolt 18, and the sleeve 19 is provided with a bore receiving a spring 35 and a ball 36 pressed by the spring 35 into a selected one of the recesses 37. With the arrangement shown in FIG. 4, the ball and detent structure operates in either direction of turning of the bolt 18 and serves to properly locate the latter not only in the starting position shown in FIG. 4 and in the two end positions determined by the cooperation of the two keys described above with the grooves 23 and 24, respectively, but in addition this ball and detent structure releasably locates the bolt 18 in an angular position intermediate its starting position and its end position with each key. This arrangement is in correspondence with the configuration of the control edge of opening 8, the pin 9 having an intermediate position at the center of opening 8, a pair of end positions respectively adjacent the ends of opening 8, and a pair of intermediate positions located between its intermediate and end positions.

When the key 17 of FIGS. 1–3 is used, the bolt 18 together with the pin 14 can be turned in one direction to move the pin 9 from its intermediate position shown in FIG. 1 in one direction to an end position or a position between its intermediate and end position, and the configuration of the edge of the opening 8 cooperates with the pin 9 to limit the turning range of the instrument 7 so as to locate the mark thereof at a preselected portion of the sheet or card, and when the key of FIG. 4 is used the bolt 18 together with the pin 14 are turned to shift the pin 9 in an opposite direction either to an opposite end position or a position between the latter end position and the intermediate position of pin 9 to cause the instrument 7 to operate at different preselected parts of the sheet or card. Different operators of the vehicle are given different keys so that the sheet or card registers which operator is driving the vehicle. Thus, when the sheet or card is moved by a clockwork mechanism, as is conventional, the device records the various times during which the vehicle is handled by different operators.

As was pointed out above, it is necessary to turn the bolt 18 through 90° in order to open the device, and the keys described above cannot open the device because of their projections 20. Moreover, it will be noted that when either key is turned from its starting position it cannot be removedf rom the lock. A person such as an employer who owns the vehicle or a manager or the like has a key without a projection 20, and such a key can be inserted into the lock to be turned through 90° so as to be capable of opening the device.

Figure 6:
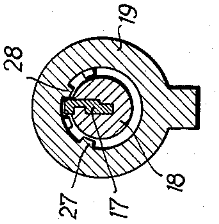
FIG. 6 is a transverse sectional view taken along line 6—6 of FIG. 5 in the direction of the arrows.
Figure 7:
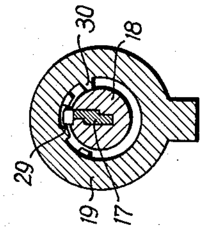
FIG. 7 is a transverse sectional view taken along line 7—7 of FIG. 5 in the direction of the arrows.

FIGS. 5–7 illustrate another embodiment of the invention where each key 17 is formed at its edge opposite from its toothed edge with a notch. Thus, FIG. 5 shows a key formed with a notch 25, and another key formed with a notch 26 shown in dot-dash lines in FIG. 5 also cooperates with the structure. The cylindrical sleeve 19 of the lock of FIGS. 5–7 is provided at the axial position of notch 25 when the key is inserted into the lock with a pair of inwardly extending projections 29 and 30 (FIG. 7) and at the axial position of the notch 26 of the other key the sleeve 19 is provided with a pair of inner projections 27 and 28 (FIG. 6). When the key having the notch 25 is inserted into the lock, it can be turned in a counterclockwise direction, as viewed in FIG. 7, past the projection 29. The projection 28 prevents clockwise turning of the key and the projection 27 limits the key to a turning angle of 45°. On the other and, when the key having the notch 26 is placed in the lock, the key can be turned in a clockwise direction past the projection 28, as viewed in FIG. 6, and in this case the projection 29 prevents counterclockwise turning of the key and the projection 30 limits the key to a turning angle of 45°. Thus, the embodiment of FIGS. 5–7 is capable of producing the same results as the embodiment of FIGS. 2–4. In order to open the device, a key having a pair of notches 25 and 26 is provided, and this key is capable of turning through 90°.

Figure 8:
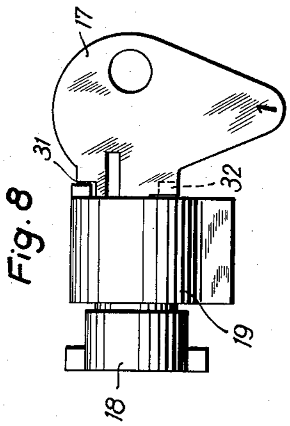
FIG. 8 is a side elevational view of another embodiment of a lock and key arrangement according to the present invention.
Figure 9:
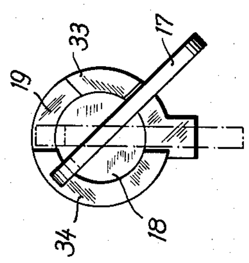
FIG. 9 is an end view of the structure of FIG. 8 as seen from the right of FIG. 8 and showing one possible operation of a key.
Figure 10:
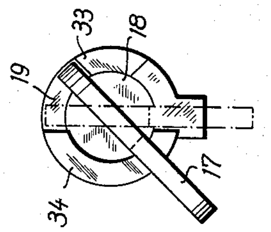
FIG. 10 is a view of the right end of the structure of FIG. 8 and showing another possible operation of a key.

FIGS. 8–10 illustrate a third possible key and lock arrangement according to the present invention. With this structure the sleeve 19 is provided at its right end, as viewed in FIG. 8, with a pair of arcuate projections 33 and 34 shown most clearly in FIGS. 9 and 10. The key for driver 1 is provided at its top edge with a cutout 31 shown in FIG. 8, and the key for driver 2 is provided with a cutout 32 at its bottom edge, as shown in dot-dash lines in FIG. 8. If the key having the notch 31 is inserted into the lock, then it may be turned from the dot-dash line position of FIG. 9 to the solid line position of FIG. 9. The bottom end of the projection 34 prevents turning of the key in a clockwise direction, as viewed in FIG. 9, and the bottom end of the projection 33 limits the key to a turning angle of 45°. When the key having the cutout 32 is used, then this key may be turned from the dot-dash line position of FIG. 10 to the solid line position of FIG. 10. In this case the top end of projection 34 prevents counterclockwise turning of the key, as viewed in FIG. 10, and the top end of the projection 33 limits the key to a turning angle of 45°. In order to open the lock a key having a pair of notches 31 and 32 is provided.

FIGS. 11–14 show an arrangement different from that of FIG. 1 for providing different types of markings on a sheet or card. With this embodiment of the invention the elongated shaft **11*a* is integral with the arm 12** and is pivotally guided at its top end, as shown in FIG. 11*a*, by a pivot pin **11*b* fixed to the housing 1 and extending through an opening of the arm 12. This arm 12 is provided with a slot 13 and cooperates with the pin 14** and the lock means in the manner described above in connection with FIG. 1. As may be seen from FIG. 11*a*, the bottom end of the shaft **11*a* has an extension 11*c* parallel to the arm 12 but extending in the opposite direction from the shaft 11*a* and formed with an elongated slot 11*d*, the top end of a pin 4′ extending through an opening of the portion 11*c* to guide the shaft 11*a* for turning movement. A bell crank lever having a pair of arms 41 and 42 cooperate with the shaft 11. At the intersection of its arms the bell crank lever carries the control pin 44 which corresponds to the pin 9 and which is fixed to the bell crank, and the free end of the arm 41 is pivotally connected at 43 to the wall of the housing 1 distant from and directed toward the cover 2 for turning movement about a predetermined axis. The free end of the arm 42 fixedly carries a pin 42′ which extends into the elongated slot 11*d*, so that in this way a pin and slot connection is provided between the shaft 11*a* and the bell crank 41, 42**.

The marking means of this embodiment is pivotally supported by a pin 47 corresponding to the pin 4, and this marking means includes an arm 46 corresponding to the arm 5 and formed with an opening 45 which has a control edge of predetermined configuration. The control pin 44 extends into the opening 45. The other arm of the marking means carries a writing instrument 7′ corresponding to the instrument 7 of FIG. 1. The ball crank 41, 42 is adapted to be located by the manually operable lever means of which it forms a part selectively in one of three positions, and the arm 42 is provided with notches 50 cooperating with a leaf spring 51 which releasably holds the pin 44 in the selected position.

The opening 45 is elongated and extends substantially radially with respect to the turning axis of the marking means, and this opening 45 is widest at its intermediate portion. The opening 45 has one end portion of lesser width than its intermediate portion and having an edge which is an extension of one of the side edges of the intermediate portion of the opening 45, and the opposite end of opening 45 also is of lesser width than the intermediate portion thereof and has an edge forming an extension of the opposite side edge of the intermediate portion of the opening 45. A spring 21′ is connected to an end 48 of the arm 46 and to the housing 1 so as to maintain the marking means astatically balanced. When the pin 44 is located at the intermediate portion of the opening 45 the marking means is capable of turning back and forth through a relatively large range, while when the pin 44 is located in either of the end portions of the opening 45, these end portions each having a width greater than the thickness of the pin 44, the marking means is limited to a turning range smaller than that through which it turns when the pin 44 is at the center of the opening 45.

In FIG. 12 the parts are shown diagrammatically in the position they take when the pin 44 is at the center of the opening 45, the marking instrument 7′ being shown diagrammatically at 49. At this time the device will produce a relatively wide mark 52 on a moving sheet or card. When the structure is set so as to locate the pin 44 at the right end of opening 45, as shown in FIG. 13, a relatively narrow mark 53 corresponding to the outer peripheral portion of mark 52 will be provided, while when the pin 44 is located at the opposite end of opening 45, as shown in FIG. 14, a mark 54 positioned differently from the mark 53 will be provided. Thus, the operators of the vehicle may be respectively provided with different keys capable of setting the device in an operating position which will record information indicative of which operator is handling the vehicle.

It will be noted that with the embodiment of FIGS. 11–14, the forces resulting from the engagement between the control pin 44 and the control edge of opening 45 are transmitted in the direction of the pivot pin 43 to the latter, so that none of these forces need be resisted by the shaft **11*a*** and the parts interconnecting the same with the lock, and in this way these parts need not be particularly strong and these forces will not be transmitted back to the lock.

FIG. 15 shows an embodiment of the invention corresponding to that of FIG. 1 but wherein the vibratory pendulum arm 5 is provided with an opening 8 of a special configuration which will indicate not only the actual driving time of an operator but also the preparation time during which the operator is getting ready to drive. The control pin 9 is turnable from the intermediate dotted line position shown in FIG. 15 by one operator to the right to the dot-dash line position of FIG. 15 and by the other operator to the left to the solid line position of FIG. 15. During this turning of the control pin 9 in either direction it moves over a curved portion of the control edge defining the opening 8 and thus causes the marking means to move quickly back and forth so as to produce a clearly visible jog in the line made by the marking means. This jog will indicate the time when the operator inserted his key into the lock and turned the key to its operating position, and this latter time may be compared with the time when the arm 5 starts to vibrate during driving of the vehicle so as to show how much time was spent in preparation for driving. The jog which is provided in this way is completely independent of the movement of the vehicle.

FIG. 16 shows a mark 56 made on the card or sheet 55 by the embodiment of FIG. 15. In the particular example illustrated, the mark 56 shows that driver 1 started his working period at 6:50 and was engaged in preparatory activities until 7:50. Then he drove until 10:40 and finished his work period at 11:00. Driver 2 started at 13:00, drove from 13:30 to 17:00, and ended his work at 17:20. The wide bands indicate the driving time and the jogs indicate when the key was turned.

The embodiment of FIG. 17 is the same as that of

FIG. 1 except that a vibratory marking device is not provided. As may be seen from FIG. 17, the writing instrument 60 is carried by an arm of a marking means having a tubular portion 61 pivotally supported by a pin 62 which corresponds to the pin 4 of FIG. 1. The other end of the tubular portion 61 fixedly carries an arm 63 having a suitably stepped control edge 65. A spring 64 is connected at one end to the housing 1 and at its opposite end to the upper arm of the marking means, as viewed in FIG. 17, and with this arrangement a preselected portion of the control edge 65 is maintained in engagement with the control pin 66 which corresponds to the control pin 9 of FIG. 1. The pin 66 is carried by an arm 67 fixed to a shaft 68, elements 67 and 68 respectively corresponding to the elements 10 and 11 of FIG. 1. The remainder of the structure of FIG. 17 is the same as that of FIG. 1. The control edge 65 has two steps located beyond each end of its intermediate step so that when the operator turns his key the pin 66 will be shifted so as to produce with the writing instrument 60 a mark 69 an example of which is indicated in FIG. 18. The position of the parts shown in FIG. 17 correspond to the rest position when no operator is working.

When an operator starts working he inserts his key into the lock and turns the key from its starting position to an intermediate position between its starting position and end position, and only when he actually starts to drive does he turn the key to its end position.

The mark 69 of FIG. 18 shows that driver 1 started his work period at 6:10 and was engaged in preparatory activities until 7:20. From the latter time until 10:00 he drove and then spent another half hour in the garage, his work period terminating at 10:50. Driver 2 started to work at 13:15 and engaged in preparatory activities until 13:50 and drove until 17:00 with a short pause at 15:00, his work period ending at 17:00.

It will be noted that with the embodiments of FIGS. 15–18 it is unnecessary for the operator to insert entries into a time book, this entire operation being performed automatically by the structure of the invention.

It will be understood that each of the elements described above, or two or more together, may also find a useful application in other types of automatic information recording devices differing from the types described above.

While the invention has been illustrated and described as embodied in an automatic recording device for vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be secured by Letters Patent is:

1. In an information recorder, in combination, support means; marking means for automatically marking information on a record carrier during relative movement between the record carrier and said marking means, said marking means being mounted on said support for movement between a first recording position and two different second recording positions offset from each other, said marking means having a control edge including a center portion associated with said first recording position, two end portions offset from each other and from said center portion and associated with said two different second recording positions, and two intermediate portions offset from each other and from said center portion and, respectively, located between said center portions and said end portion; lock means on said support including a stationary lock member and a turnable lock member; control means including a control member connected to the turnable lock member for movement therewith and engaging said control edge, said turnable lock member being normally in a position of rest in which said control member engages said center portion of said control edge and being turnable in opposite directions through two intermediate positions in which said control member respectively engages said intermediate portions for shifting said marking means to said second recording positions, respectively, and back, to two operative positions in which said control member respectively engages said end portions for holding said marking means in one of said second recording positions, respectively, said intermediate portions of said control edge having such a shape as to produce a characteristic recording on the record carrier by said marking means for determining the time period between operation of said turnable lock member and the start of recording in said second recording positions of said marking means; and two keys of different shape for selectively operating said lock means by turning said turnable lock member, said stationary lock member including a first blocking means blocking turning movement of one of said keys in one direction, and a second blocking means blocking turning movement of the other of said keys in the opposite direction so that by selective operation of said different keys said marking means are placed in said two different second recording positions for producing offset recordings on the record carrier.

2. A recording arrangement as set forth in claim 1 wherein said marking means include a pivoted member formed with an elongated slot having said control edge, said control member being a pin located in said slot.

3. A recording arrangement as set forth in claim 1 wherein said marking means include a pivoted member having said control edge, wherein said control member is a pin engaging said edge; and spring means urging said pivoted member and said control edge against said pin.

4. In an information recorder, in combination, a support adapted to be mounted on an apparatus vibrating during operation; marking means for automatically marking information on a record carrier during relative movement between the record carrier and said marking means, said marking means being mounted on said support for oscillatory movement so as to oscillate when the apparatus vibrates; manually operated means movable between a normal first position of rest, a second position and a third position, one of said last mentioned two means having a control edge including two control portions and an intermediate connecting portion between said control portions and the other of said means including a control member engaging said control edge, said control member engaging one of said control portions when said manually operated means is in said first position, and engaging first said connecting portion and then the other control portion when said manually operated member is moved through the second position to said third position, said one control portion having such a shape as to limit oscillatory movement of said marking means to produce a first characteristic recording, said other control portion having such a shape as to limit oscillatory movement of said marking means to produce a second characteristic recording, and said connecting portion of said control edge having such a shape as to produce a third characteristic recording by said marking means on said record carrier for determining the time period between the operation of said manually operated means and the start of said second characteristic recording.

5. A recorder as set forth in claim 4 and including biasing means for urging said control member and said control edge against each other.

6. A recorder as set forth in claim 4 wherein said one control portion has such a shape that said control member is confined by said one control portion so that said first characteristic recording is a line.

7. A recorder as set forth in claim 4 wherein said one control portion has such a shape that said control member and control edge permit an oscillatory movement of said marking means at a first amplitude, and wherein said other control portion has such a shape that said control member and said control edge permit an oscillatory movement of said marking means at a second different amplitude.

8. A recorder as set forth in claim 4 wherein said manually operated means include a lock member; and a key cooperating with said lock member for moving said manually operated means between said positions thereof.

9. In an information recorder, in combination, a support adapted to be mounted on an apparatus vibrating during operation; marking means for automatically marking information on a record carrier during relative movement between the record carrier and said marking means, said marking means being mounted on said support for oscillatory movement so as to oscillate when the apparatus vibrates; manually operated means having a first normal position of rest and being movable in opposite directions through two intermediate second positions to third end positions, respectively, one of said last mentioned two means having a control edge including a central portion, two control portions offset from each other and from said central portion, and two connecting portions respectively located between said central portion and said control portions, and the other of said means including a control member engaging said control edge, said control member engaging said central portion in said first position of said manually operated means, and engaging said connecting portions and then said control portions, respectively, when said manually operated member is moved through one of said second positions to one of said third positions, respectively, said central portion having such a shape as to limit oscillatory movement of said marking means to produce a first characteristic recording, said control portions having such a shape as to limit oscillatory movement of said marking means to produce corresponding but offset second characteristic recordings, and said connecting portions having such a shape as to produce third corresponding characteristic recordings by said marking means on said record carrier for determining the time period between the operation of said manually operated means and the start of one of said second characteristic recordings.

10. A recorder as set forth in claim 9 and including biasing means for urging said control member against said control edge; and wherein said central portion confines said marking member so that said first characteristic recording is a line.

11. In an information recorder, in combination, a support adapted to be mounted on an apparatus vibrating during operation; marking means for automatically marking information on a record carrier during relative movement between the record carrier and said marking means, said marking means being mounted on said support for oscillatory movement so as to oscillate when the apparatus vibrates, said marking means having a control slot including two offset control portions and an intermediate connecting portion between said control portions; and manually operated means movably mounted on said support means and including a control member located in said control slot, said manually operated means being normally in a first position in which said control member is located in one of said control portions of said control slot, said one control portion having such a shape as to limit oscillatory movement of said marking means to produce a first characteristic recording, said manually operated means being movable through a second position in which said control member is located in said connecting portion to an operative position in which said control member is located in the other control portion of said control slot, said other control portion having such a shape as to limit oscillatory movement of said marking means to produce a second characteristic recording, and said connecting portion of said control slot having such a shape as to produce a third characteristic recording by said marking means on said record carrier for determining the time period between the operation of said manually operated means and the start of said second characteristic recording.

12. A recorder as set forth in claim 11 wherein said one control portion of said slot has a width substantially corresponding to the thickness of said control member so that the same is confined and oscillatory movement of said marking means is limited to a line.

13. A recorder as set forth in claim 11 wherein said one control portion of said slot has a width greater than the width of the other control portion of said slot so that said first characteristic recording has a wider amplitude than said second characteristic recording.

References Cited in the file of this patent

UNITED STATES PATENTS

| | | |
|---|---|---|
| 1,373,204 | Phelps | Mar. 29, 1921 |
| 2,009,640 | Stone et al. | July 30, 1935 |
| 2,667,785 | Opocensky | Feb. 2, 1954 |
| 2,743,987 | Meer | May 1, 1956 |

FOREIGN PATENTS

| | | |
|---|---|---|
| 388,279 | Great Britain | Feb. 23, 1933 |